United States Patent
Chanag et al.

(10) Patent No.: US 7,119,867 B2
(45) Date of Patent: *Oct. 10, 2006

(54) LIQUID CRYSTAL DISPLAY DEVICE AND METHOD OF MANUFACTURING THE SAME

(75) Inventors: Hak-Sun Chanag, Seoul (KR); Kyeong-Hyeon Kim, Yongin-si (KR); Chang-Hun Lee, Yongin-si (KR); Jang-Kun Song, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/243,986

(22) Filed: Oct. 6, 2005

(65) Prior Publication Data

US 2006/0028602 A1    Feb. 9, 2006

Related U.S. Application Data

(63) Continuation of application No. 10/683,268, filed on Oct. 14, 2003, now Pat. No. 6,977,703.

(30) Foreign Application Priority Data

May 13, 2003    (KR) .................... 10-2003-0030105

(51) Int. Cl.
*G02F 1/1335* (2006.01)
*G02F 1/13* (2006.01)

(52) U.S. Cl. ..................... 349/117; 349/187

(58) Field of Classification Search ........ 349/117–119, 349/187, 96
See application file for complete search history.

(56) References Cited

U.S. PATENT DOCUMENTS

| | | | |
|---|---|---|---|
| 6,646,701 B1 | 11/2003 | Lyu et al. | 349/119 |
| 6,977,703 B1 * | 12/2005 | Chanag et al. | 349/118 |
| 2004/0080692 A1 | 4/2004 | Kim et al. | 349/117 |
| 2004/0160559 A1 | 8/2004 | Kim et al. | 349/117 |

* cited by examiner

*Primary Examiner*—Dung T. Nguyen
(74) *Attorney, Agent, or Firm*—Cantor Colburn LLP

(57) ABSTRACT

The liquid crystal display device includes a liquid crystal display panel, a c-plate mono-axial compensating film, first and second polarizing plates. The liquid crystal display panel includes a first substrate having a first electrode, a second substrate having a second electrode, and liquid crystal interposed between the first and second substrates. The liquid crystal is vertically aligned when no electrical filed is applied between the first and second electrodes. The c-plate mono-axial compensating film is disposed on the first substrate. The first polarizing plate is disposed on the c-plate mono-axial compensating film. The second polarizing plate is disposed on the second substrate. A liquid crystal display device according to an embodiment of the present invention has reduced thickness, weight. Further, the liquid crystal display device has increased luminance and broadened viewing angle.

9 Claims, 12 Drawing Sheets

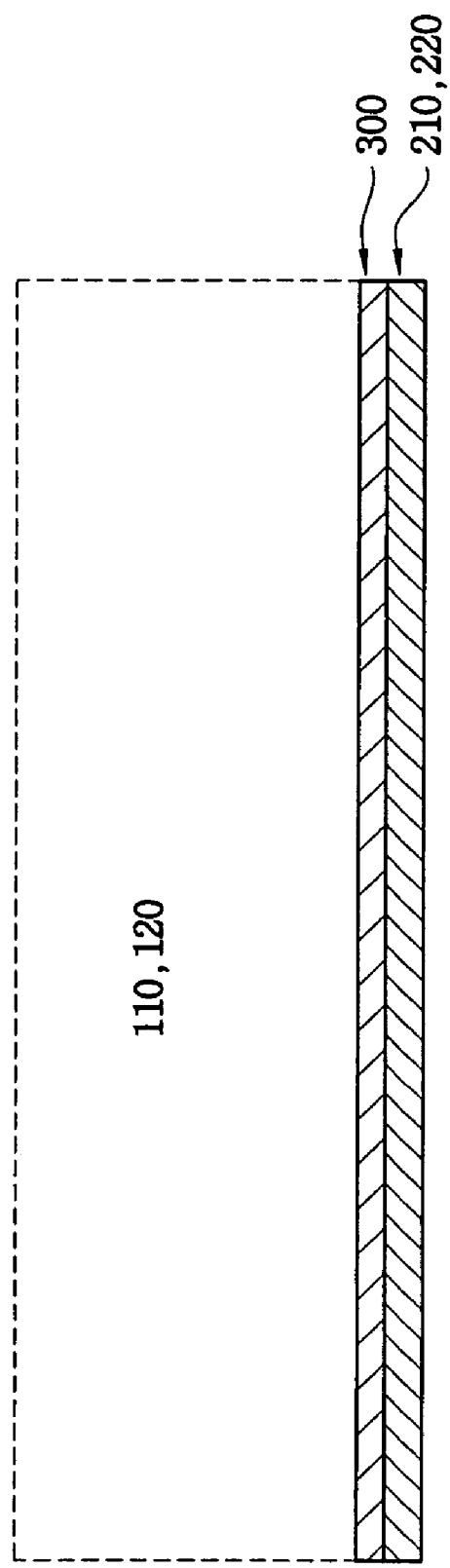

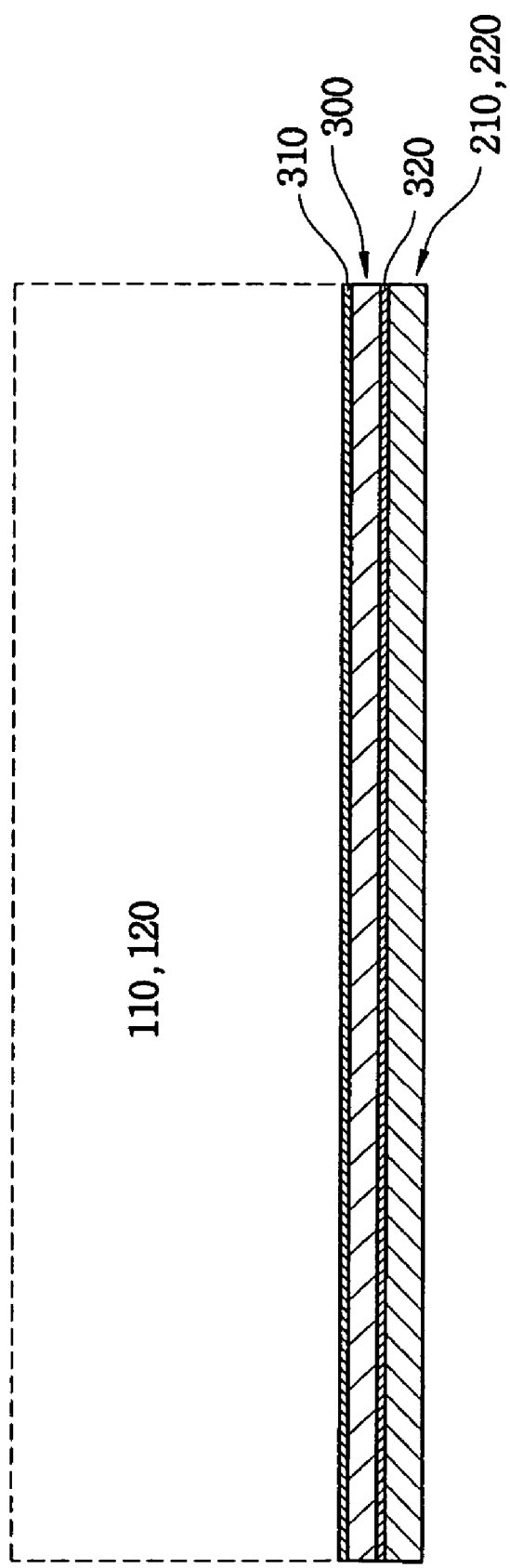

LIQUID CRYSTAL DISPLAY DEVICE AND METHOD OF MANUFACTURING THE SAME

CROSS REFERENCE TO PRIOR APPLICATIONS

This application is a Continuation Application of a co-pending U.S. patent application Ser. No. 10/683,268 filed on Oct. 14, 2003 and issued as U. S. Pat. No. 6,977,703, which claims priority to and the benefit of Korean Patent Application No. 10-2003-0030105 filed on May 13, 2003, which are all hereby incorporated by reference for all purposes as if fully set forth herein.

This application relies for priority upon Korean Patent Application No. 2003-30105 filed on May 13, 2003, the contents of which are herein incorporated by reference in its entirety.

BACKGROUND OF THE INVENTION

1. Field of the Invention

The present invention relates to a liquid crystal display device and a method of manufacturing the liquid crystal display device, and more particularly to a liquid crystal display device having an enhanced viewing angle and an enhanced luminance, and a method of manufacturing the liquid crystal display device.

2. Description of the Related Art

Electric field changes an arrangement of liquid crystal molecules. When the arrangement of the liquid crystal molecules are changed, a transmittance of the liquid crystal is changed in accordance with the arrangement of the liquid crystal molecule. A liquid crystal display (LCD) device uses liquid crystal so as to display an image. The liquid crystal display device may display a black and white image or a color image.

The liquid crystal display device includes a pixel electrode and a common electrode. The area of the pixel electrode is very small. The liquid crystal is interposed between the pixel electrode and the common electrode. When electric fields are formed between the pixel electrode and the common electrode, an arrangement of the liquid crystal is changed.

The liquid crystal display device is lighter and smaller than a cathode ray tube (CRT) display device. Therefore, the liquid crystal display device is widely used as a display device for a portable computer, a watch and a cellular phone. Recently, the liquid crystal display device is used for a television set.

However, the liquid crystal display device has a narrow viewing angle. Therefore, when the liquid crystal display device is seen at a position deviated from the liquid crystal display device, a gray scale inversion occurs or distorted image is displayed. Further, a luminance of the liquid crystal display device is relatively low.

In recent years, a Vertical Alignment (VA) mode or In Plane Switching (IPS) technology are developed so as to broaden the viewing angle.

A compensation film for broadening the viewing angle may be used in the vertical alignment mode liquid crystal display device. The compensation film for broadening the viewing angle may be used in the liquid crystal display device adopting the in plane switching technology so as to widen the viewing angle.

Various compensation films have been developed. For example, a biaxial film is used so as to broaden the viewing angle in the U.S. Pat. No. 6,515,728 (entitled "Multi-domain liquid crystal display device").

A thickness of the biaxial compensating film is about 80 μm and a thickness of adhesive layer for attaching the biaxial compensating film is about 25 μm. The biaxial compensating film is attached on the both faces of the liquid crystal display panel. Therefore, a thickness of the liquid crystal display device is increased by a 210 μm. The two biaxial compensating films increase the thickness of the liquid crystal display device by 160 μm. The two adhesive layers increase the thickness by 50 μm. Therefore, a volume and a weight of the liquid crystal display device are increased. Further, when the biaxial compensation film is used, a volume or a weight of other element such as a light guide plate, a case or a liquid crystal display panel may be reduced so as to constantly maintain the volume or weight.

Further, when the biaxial compensation film is used, a step of manufacturing process is increased, so that the productivity is lowered.

SUMMARY OF THE INVENTION

Accordingly, the present invention is provided to substantially obviate one or more problems due to limitations and disadvantages of the related art.

A liquid crystal display device according to an exemplary embodiment of the present invention includes a liquid crystal display panel, a c-plate mono-axial compensating film, a first polarizing plate and a second polarizing plate. The liquid crystal display panel includes a first substrate having a first electrode, a second substrate having a second electrode, and liquid crystal interposed between the first substrate and the second substrate. The liquid crystal is vertically aligned when no electrical filed is applied between the first electrode and the second electrode. The c-plate mono-axial compensating film is disposed on the first substrate. The first polarizing plate is disposed on the c-plate mono-axial compensating film. The second polarizing plate is disposed on the second substrate.

In one aspect of the present invention, there is provided a method of manufacturing the liquid crystal display device. A liquid crystal display panel is manufactured. The liquid crystal display panel includes a first substrate having a first electrode, a second substrate having a second electrode, and liquid crystal interposed between the first substrate and the second substrate. The liquid crystal is vertically aligned when no electrical filed is applied between the first electrode and the second electrode. A c-plate mono-axial compensating film is formed on the first substrate. A first polarizing plate is attached on the first substrate. A second polarizing plate is attached on the second polarizing plate.

A liquid crystal display device according to an embodiment of the present invention has reduced thickness, weight. Further, the liquid crystal display device has increased luminance and broad viewing angle.

According to a method of manufacturing the liquid crystal display device, a number of manufacturing steps and a manufacturing time are reduced.

BRIEF DESCRIPTION OF THE DRAWINGS

The above and other features and advantages of the present invention will become more apparent by describing in detail the preferred embodiments thereof with reference to the accompanying drawings, in which:

FIG. 6 is a schematic cross-sectional view showing a c-plate mono-axial compensating film that is integrally formed with a polarizing plate;

FIG. 7 is a schematic cross-sectional view showing a c-plate mono-axial compensating film that is attached on a polarizing plate via an adhesive layer;

DESCRIPTION OF INVENTION

Hereinafter the preferred embodiment of the present invention will be described in detail with reference to the accompanying drawings.

Embodiment of a Liquid Crystal Display Device

Figure 1:
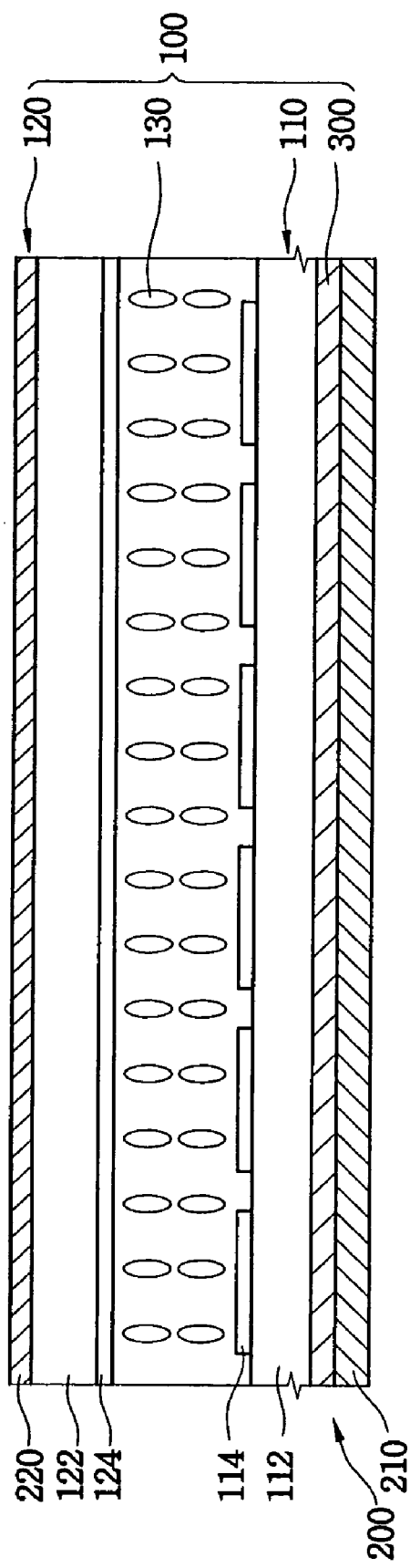
FIG. 1 is a schematic cross-sectional view showing a liquid crystal display device according to an embodiment of the present invention.

FIG. 1 is a schematic cross-sectional view showing a liquid crystal display device according to an embodiment of the present invention.

Referring to FIG. 1, a liquid crystal display device 400 includes a liquid crystal display panel 100, a polarizing plate 200 and a c-plate mono-axial compensating film 300. The liquid crystal display device 400 may includes a back light assembly for supplying the liquid crystal display panel 100 with light.

The liquid crystal display panel 100 includes a first substrate 110, a second substrate 120 and liquid crystal molecules 130.

Figure 2:
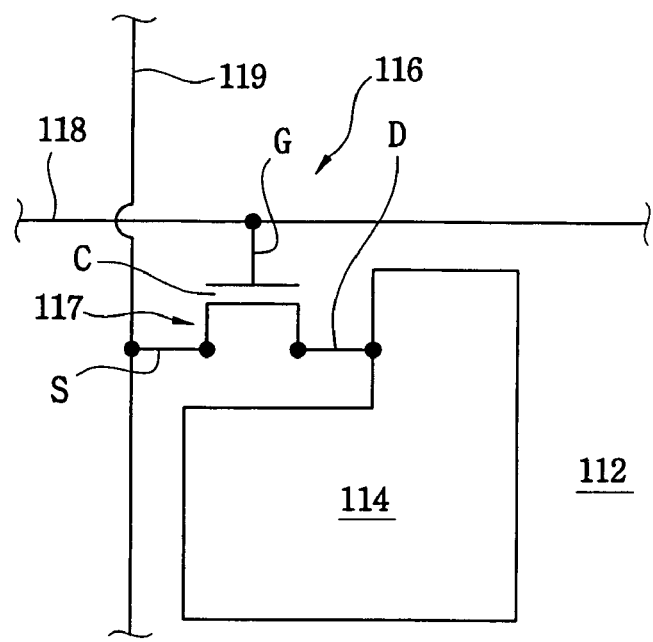
FIG. 2 is a schematic view of a pixel of a first substrate of FIG. 1.

FIG. 2 is a schematic view of a pixel of a first substrate of FIG. 1.

Referring to FIGS. 1 and 2, a first substrate 110 includes a first transparent substrate 112, a pixel electrode 114 and a voltage supplying part 116. A glass substrate may be used as the first transparent substrate 112. The pixel electrode 114 is arranged in a matrix shape on the first transparent substrate 112.

When a resolution of the liquid crystal display device 400 is 1024×768, a number of the pixel electrode 114 is 1024×768×3. The pixel electrode 114 comprises Indium Tin Oxide (ITO) or Indium Zinc Oxide (IZO). The indium tin oxide and indium zinc oxide are transparent and conductive materials. The indium tin oxide and the indium zinc oxide are deposited on the first transparent substrate 112 and then patterned, thereby forming the pixel electrode.

The voltage supplying part 116 is electrically connected with the pixel electrode 114 formed on a first transparent substrate 112. The voltage supplying part 116 applies different voltages to each of the pixel electrodes. The voltage supplying part 116 includes a thin film transistor 117 and a signal line. The signal line includes a gate bus line 118 and a data bus line 119. The gate bus line 118 and the data bus line 119 are electrically connected with the thin film transistor 117.

The thin film transistor 117 is electrically connected to the pixel electrode 114. The thin film transistor 117 includes a gate electrode G, a source electrode S, a drain electrode D and a channel layer C. A metal layer deposited on the first substrate 110 is patterned, so that the gate electrode G is formed. The channel layer C is formed on the gate electrode G. The channel layer C insulates the gate electrode G from the drain electrode D. Further, the channel layer C insulates the gate electrode G from the source electrode S. The channel layer C may be a one layered-structure including only an amorphous-silicon layer or a two-layered structure including an amorphous-silicon layer and an $n^+$ amorphous-silicon layer deposited on the amorphous-silicon layer.

The source electrode S and the drain electrode D are formed on the channel layer C. The source electrode S is insulated from the drain electrode D.

The signal line includes a gate bus line 118 and a data bus line 119. The data bus line 119 is insulated from the gate bus line 118. The data bus line 119 is arranged substantially perpendicular to the gate bus line 118. The gate bus line 118 is electrically connected with the gate electrode G of the thin film transistor 117. The data bus line 119 is electrically connected with the source electrode S of the thin film transistor 117.

The second substrate 120 faces the first substrate 110. The second substrate 120 includes a second transparent substrate 122 and a common electrode 124. The second substrate 120 may includes a color filter.

A glass substrate may be used as the second transparent substrate 122. The common electrode 124 is formed on the second transparent substrate 122, such that the common electrode 124 faces the pixel electrode 114. The common electrode 124 comprises the indium tin oxide (ITO) or the indium zinc oxide (IZO). The indium tin oxide layer or the indium zinc oxide layer is patterned, so that the common electrode 124 is formed. The color filter (not shown) may be interposed between the second transparent substrate 122 and the common electrode 124. In detail, the color filter (not shown) may be formed on the second transparent substrate 122, such that the color filter (not shown) faces the pixel electrode 114. An area of the color filter (not shown) is substantially equal to an area of the pixel electrode 114.

In the embodiment described above, the pixel electrode 114 is formed on the first substrate 110, and the common electrode 124 is formed on the second substrate 120. However, the pixel electrode 114 may be formed on the second substrate 120, and the common electrode 124 may be formed on the first substrate 110.

The first substrate 110 is connected with the second substrate 120 with a sealant (not shown). The sealant (not shown) is formed along the edges of the first substrate 110 and the second substrate 120. A space defined by the first substrate 110, the second substrate 120 and the sealant receives the liquid crystal 130. A cell gap between the first substrate 110 and the second substrate 120 is preferably in the range from about 3.75 μm to about 4 μm.

The liquid crystal 130 may be dropped on the first substrate 110 or on the second substrate 120. The first substrate 110 is combined with the second substrate 120, so that the liquid crystal 130 is interposed between the first substrate 110 and the second substrate 120.

The first substrate 110 may be combined with the second substrate 120 firstly. Then, the liquid crystal 130 may be injected between the first substrate 110 and the second substrate 120 due to a vacuum pressure of the space. The liquid crystal molecules 130 are vertically aligned, so that a director of the liquid crystal molecule is perpendicular to the first substrate 110 and to the second substrate 120 when no electric field is applied between the pixel electrode 114 and the common electrode 124. That is, the liquid crystal display device corresponds to vertical alignment mode.

A first polarizing plate 210 is attached on an outer face of the first transparent substrate 112. A second polarizing plate 220 is attached on an outer face of the second transparent substrate 122. An optical axis of the first polarizing plate 210 may be parallel or perpendicular to an optical axis of the second polarizing plate 220.

A c-plate mono-axial compensating film 300 is disposed between the first polarizing plate 210 and the first transparent substrate 112. The c-plate mono-axial compensating film 300 may be disposed between the second polarizing plate 220 and the second transparent substrate 122. The c-plate mono-axial compensating film 300 increases the viewing angle and the luminance.

Figure 3:
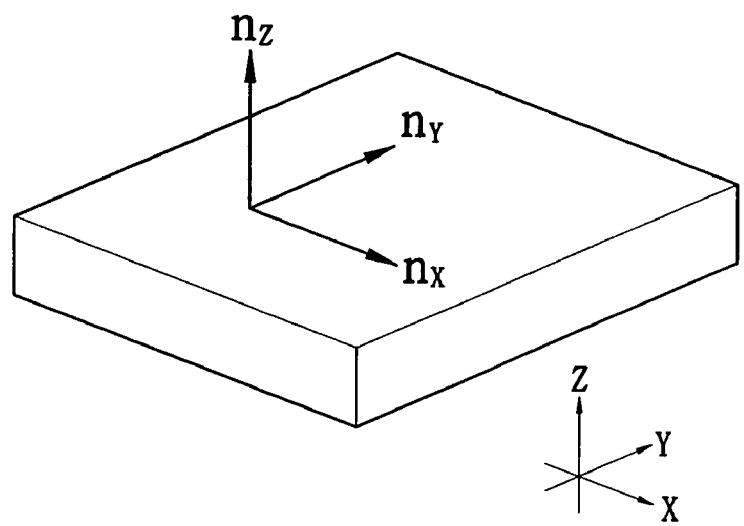
FIG. 3 is schematic perspective view of a c-plate mono-axial compensating film of FIG. 1.

FIG. 3 is a schematic perspective view of the c-plate mono-axial compensating film 300 of FIG. 1.

Referring to FIG. 3, the c-plate mono-axial compensating film 300 has a first refractive index $n_x$, a second refractive index $n_y$, and a third refractive index $n_z$. The first refractive index $n_x$ corresponds to a refractive index in an x-direction of a Cartesian coordinate. The second refractive index $n_y$ corresponds to a refractive index in an y-direction of the Cartesian coordinate. The third refractive index $n_z$ corresponds to a refractive index in a z-direction (or normal direction of the c-plate mono-axial compensating film 300) of the Cartesian coordinate.

A retardation value $R_{th}$ of the c-plate mono-axial compensating film 300 is described as a following expression 1.

$$R_{th}=[(n_x+n_y)/2-n_z]\cdot d, \qquad \text{<Expression 1>}$$

wherein "d" denotes a thickness of the c-plate mono-axial compensating film 300, and $n_x=n_y>n_z$.

The retardation value $R_{th}$ of the c-plate mono-axial compensating film 300 according to the present embodiment is in the range from about 220 nm to about 270 nm.

When the retardation value $R_{th}$ of the c-plate mono-axial compensating film 300 is in the range from about 220 nm to about 270 nm, the viewing angle is broad and the luminance is high. Further, when the retardation value $R_{th}$ of the c-plate mono-axial compensating film 300 is in the range from about 220 nm to about 270 nm, a thinner of the c-plate mono-axial compensating film 300 may be used. As a result of simulation, when the retardation value $R_{th}$ of the c-plate mono-axial compensating film 300 is smaller than 220 nm or larger than 270 nm, the luminance is lowered and a gray scale inversion is occurs.

Figure 4:
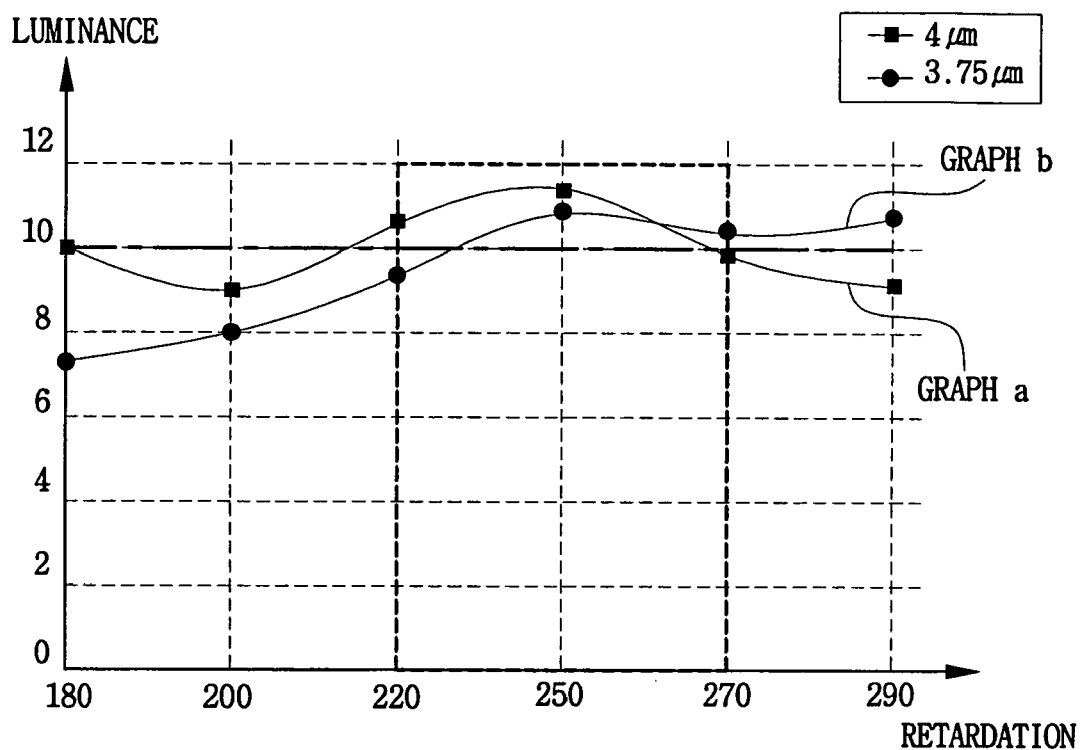
FIG. 4 is graphs showing a luminance in accordance with a retardation of a c-plate mono-axial compensating film of FIG. 1.

FIG. 4 is graphs showing a luminance in accordance with a retardation of a c-plate mono-axial compensating film of FIG. 1. The graph 'a' shows the luminance when a cell gap (or a distance between the first substrate 110 and the second substrate 120) is 3.75 μm. The graph 'b' shows the luminance when the cell gap is 4 μm.

Referring to FIG. 4, when the retardation $R_{th}$ is in the range from about 220 nm to about 270 nm, the luminance is relatively high.

In case that a thickness of the c-plate mono-axial compensating film is in a range from about 4 μm to about 5 μm, the retardation of the c-plate mono-axial compensating film 300 is in the range from about 220 nm to about 270 nm.

When the thickness of the c-plate mono-axial compensating film is about 5 μm, and the thickness of an adhesive layer is about 25 μm, the thickness is about 30 μm that is only one seventh of the thickness 210 nm of the two general biaxial films.

Even when two adhesive layers are formed on both faces of the c-plate mono-axial compensating film 300, the total thickness is in the range from about 54 μm to about 55 μm, which is one fourth of the thickness of the two general biaxial films.

A c-plate mono-axial compensating material having fluidity is disposed on the first substrate 110 or on the second substrate 120. Then, the c-plate mono-axial compensating material is spread, so that the c-plate mono-axial compensating film of which thickness is in the range from about 4 μm to about 5 μm is formed.

Figure 5:
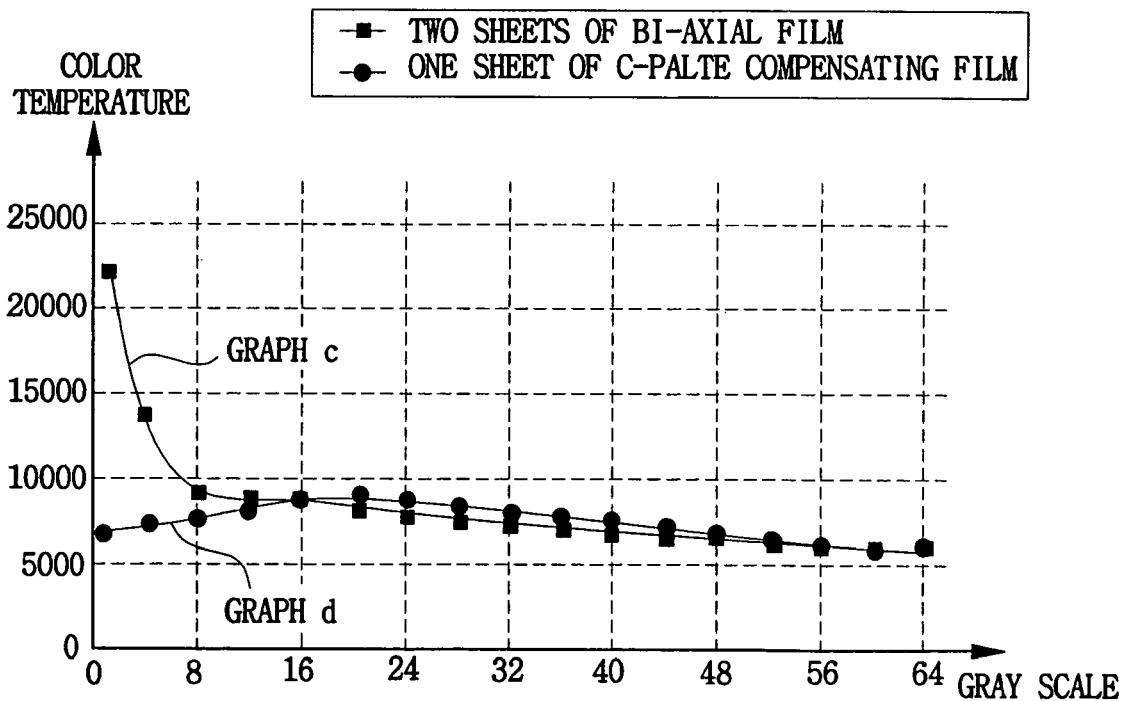
FIG. 5 is graphs showing a color temperature in accordance with a gray scale for two general bi-axial films and for a c-plate mono-axial compensating film.

FIG. 5 is graphs showing a color temperature in accordance with a gray scale for two general bi-axial films and for c-plate mono-axial compensating film.

The graph 'c' corresponds to a color temperature of the two general biaxial films. The graph 'd' corresponds to the color temperature of the c-plate mono-axial compensating film.

The color temperature (or Kelvin temperature, K) is a physical and objective criterion of light having a color. Light having orange-color corresponds to a relatively low color temperature. Light having white-color corresponds to a relatively high color temperature. Light having blue-color corresponds to more high color temperature. For example, a color temperature of light emitted from a light bulb is about 2,800K. A color temperature of light emitted from fluorescent lamp is in the range from about 4,500K to about 6,500K. A color temperature of solar light at noon is about 5,400K. A color temperature of light of gloomy day is in the range from about 6,500K to about 7,000K. A color temperature of light of blue sky is in the range from about 12,000K to about 18,000K. The color temperature is measured via a colored glass and a standard illuminant.

Referring to graph c, a liquid crystal display device having the two general biaxial films has a very high color temperature, when the gray scale is low. Therefore, an image displayed on the liquid crystal display device has blue tone. When the gray scale becomes higher than 16, an image has a color temperature that is similar to the natural (solar) light.

Referring to graph d, an image displayed on a liquid crystal display device having a c-plate mono-axial compensating film has substantially uniform color temperature regardless of the gray scale.

The c-plate mono-axial compensating film of which thickness is in the range from about 4 μm to about 5 μm enhances the luminance, and reduces variation of the color temperature, a thickness and a volume of the liquid crystal display device.

FIG. 6 is a schematic cross-sectional view showing a c-plate mono-axial compensating film that is integrally formed with a polarizing plate.

Referring to FIG. 6, a c-plate mono-axial compensating film 300 may be integrally formed with a first polarizing plate 210, and the c-plate mono-axial compensating film 300 may be attached on a first substrate 110. The c-plate mono-axial compensating film 300 may be integrally formed with a second polarizing plate 220, and the c-plate mono-axial compensating film 300 may be attached on a second substrate 120. That is, the c-plate mono-axial compensating film 300 may be attached on one of the first polarizing plate 210 and the second polarizing plate 220.

FIG. 7 is a schematic cross-sectional view showing a c-plate mono-axial compensating film that is attached on a polarizing plate via an adhesive layer.

Referring to FIG. 7, a c-plate mono-axial compensating film 300 may be attached on the first substrate 110 or on the second substrate 120 via a first adhesive layer 310. A first polarizing plate 210 or a second polarizing plate 220 may be attached on the c-plate mono-axial compensating film 300 via a second adhesive layer 320.

For example, a thickness of the first adhesive layer 310 and the second adhesive layer 320 may be less than 25 μm so as to reduce a thickness of the liquid crystal display device.

A c-plate mono-axial compensating material may be mixed with an adhesive material and may be coated on the first substrate 110 or on the second substrate 120.

According to the embodiment described above, a weight and a volume of the liquid crystal display device are reduced. Further, the luminance is enhanced, a viewing angle is broadened, and a number of manufacturing steps and a time for manufacturing the liquid crystal display device are reduced.

Embodiment of Method of Manufacturing Liquid Crystal Display Device

Figure 8A:
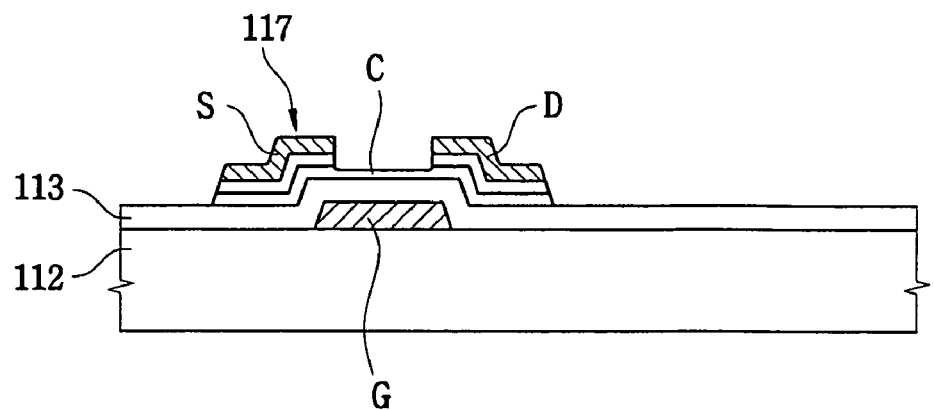
FIG. 8A is a cross-sectional view showing a thin film transistor of a first substrate of FIG. 1.
Figure 8B:
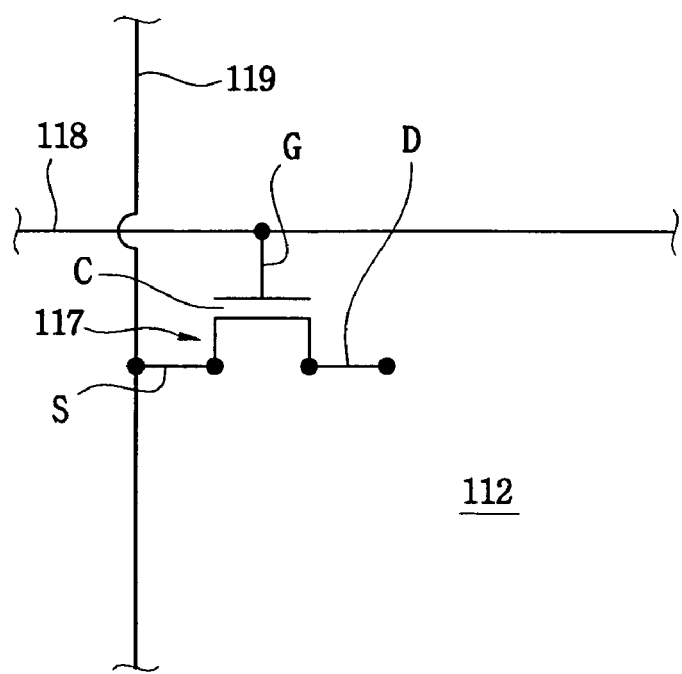
FIG. 8B is a schematic view showing a thin film transistor of the FIG. 8A.

FIG. 8A is a cross-sectional view showing a thin film transistor of a first substrate of FIG. 1, and FIG. 8B is a schematic view showing a thin film transistor of the FIG. 8A.

Referring to FIGS. 8A and 8B, a gate metal such as aluminum (Al) or an alloy of aluminum is deposited on a first transparent substrate 112 to form a gate metal layer by sputtering method or chemical vapor deposition (CVD).

The gate metal layer is patterned by a photolithography process, so that a gate bus line 118 and a gate electrode G elongated from the gate bus line 118 are formed.

Then a gate insulation layer 113 is deposited on a surface of the first transparent substrate 112 by a chemical vapor deposition method, such that the gate insulation layer 113 may cover the gate electrode G.

An amorphous-silicon layer is deposited on the gate insulation layer 113. An n⁺ amorphous-silicon layer is deposited on the amorphous-silicon layer. A metal layer is deposited on the n⁺ amorphous-silicon layer. Then, the amorphous-silicon layer, the n⁺ amorphous-silicon layer and the metal layer are patterned so that a thin film having a source electrode S, a drain electrode D and a channel layer C, and a data bus line 119 are formed.

Figure 8C:
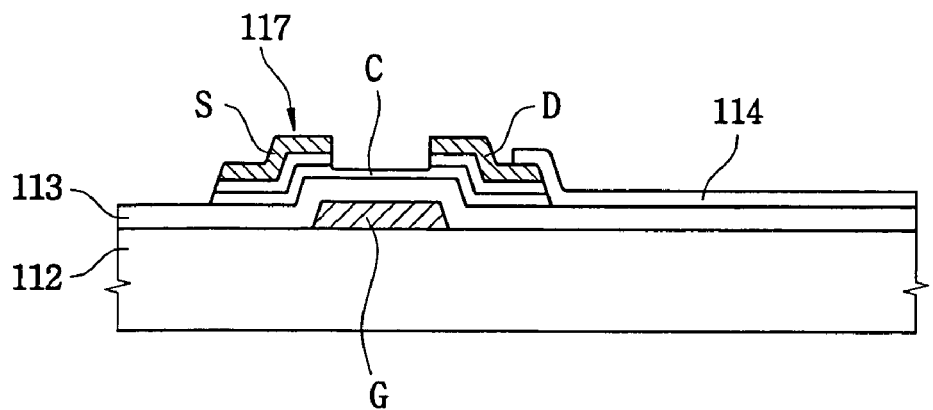
FIG. 8C is a cross-sectional view showing a pixel electrode electrically connected with a thin film transistor of FIG. 8A.
Figure 8D:
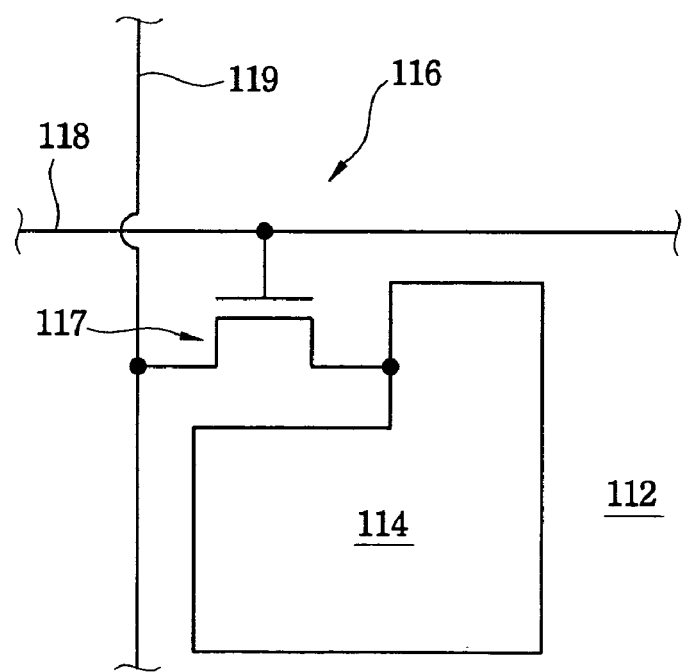
FIG. 8D is a schematic view showing a pixel electrode of FIG. 8C.

FIG. 8C is a cross-sectional view showing a pixel electrode electrically connected with a thin film transistor of FIG. 8A, and FIG. 8D is a schematic view showing a pixel electrode of FIG. 8C.

Referring to FIGS. 8C and 8D, a pixel electrode 114 is formed, such that the pixel electrode 114 makes contact with the drain electrode D. The pixel electrode 114 comprises Indium Tin Oxide (ITO) or Indium Zinc Oxide (IZO). Then, an alignment film (not shown) is formed on the first transparent substrate 112. A groove (not shown) for aligning a liquid crystal molecule is formed on the alignment film (not shown).

Figure 9A:
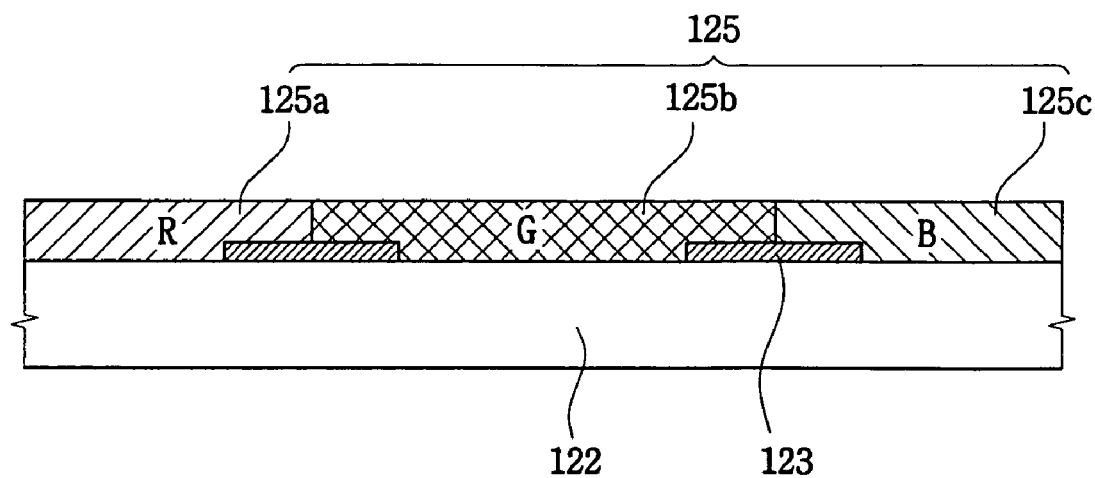
FIG. 9A is a schematic cross-sectional view showing a second substrate of FIG. 1 having no common electrode deposited thereon.
Figure 9B:
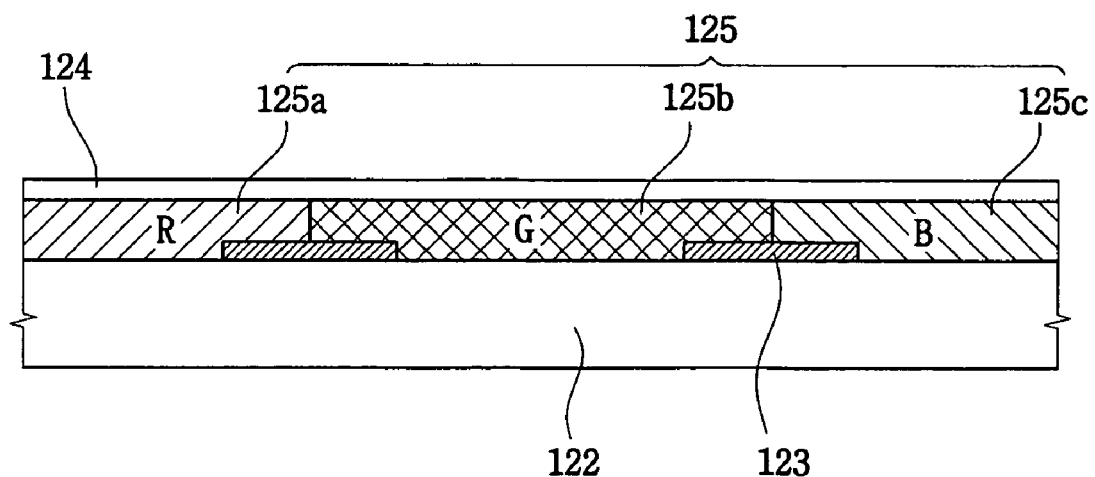
FIG. 9B is a schematic cross-sectional view showing a second substrate of FIG. 1 having a common electrode deposited thereon.

FIG. 9A is a schematic cross-sectional view showing a second substrate of FIG. 1 having no common electrode deposited thereon, and FIG. 9B is a schematic cross-sectional view showing a second substrate of FIG. 1 having a common electrode deposited thereon.

Referring to FIGS. 8D, 9A and 9B, a black matrix 123 for shielding a region disposed between the pixel electrodes 114 of the first transparent substrate 110 is formed on the second transparent substrate 122. The black matrix 123 may have a rectangular shape.

A color filter 125 is formed on the second transparent substrate 122. The color filter 125 is disposed between the black matrixes 123, such that the color filter 125 faces the pixel electrode 114. A photosensitive material is mixed with a pigment or with dyes. The pigment or the dyes have a red color. The photosensitive material mixed with the pigment or the dyes is coated on the second transparent substrate 122, and patterned by a photolithography process, so that a R-color filter 125a is formed. A G-color filter 125b having green color and a B-color filter 125c having blue color are formed on the second transparent substrate 122 via the same process, respectively.

A common electrode 124 is formed on the color filter 125. The common electrode 124 comprises Indium Tin Oxide (ITO) or Indium Zinc Oxide (IZO).

Figure 10:
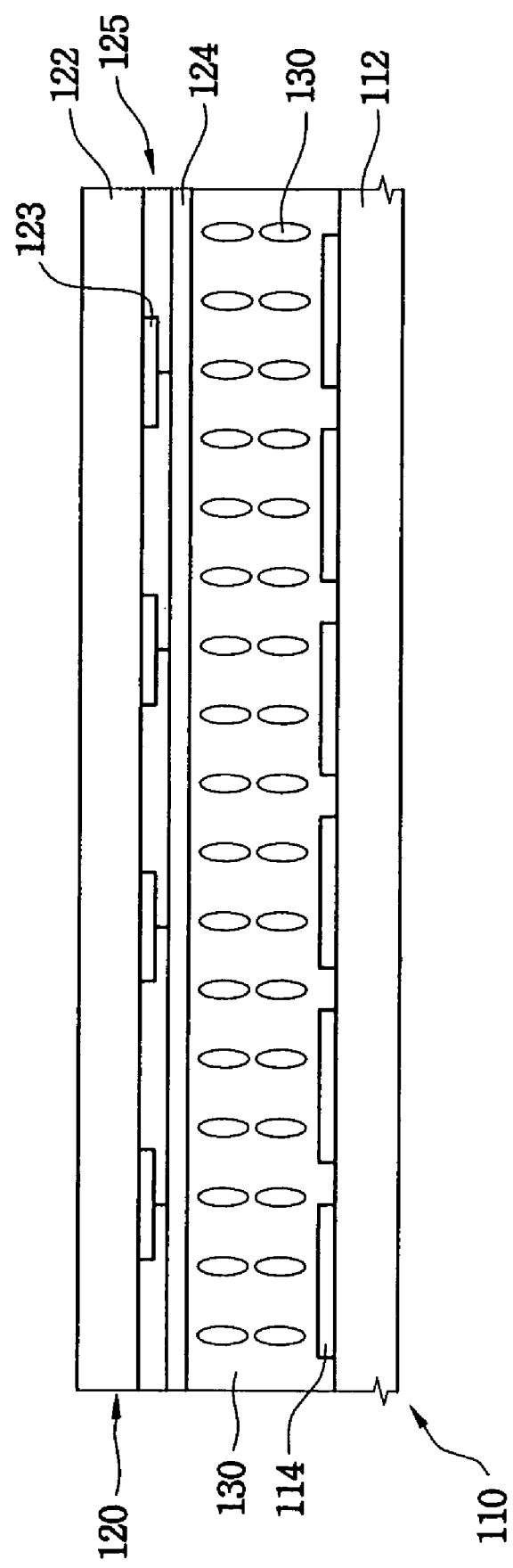
FIG. 10 is a schematic cross-sectional view showing a liquid crystal display panel having no c-plate mono-axial compensating film coated thereon.

FIG. 10 is a schematic cross-sectional view showing a liquid crystal display panel having no c-plate mono-axial compensating film coated thereon.

Referring to FIG. 10, a first substrate 110 is assembled with a second substrate 120, such that a pixel electrode 114 of the first substrate 110 faces a common electrode 124 of the second substrate 120. For example, a cell gap (or a distance between the first substrate 110 and the second substrate 120) is in the range from about 3.75 μm to about 4 μm.

Liquid crystal is injected into a space formed between the first substrate 110 and the second substrate 120. The liquid crystal may be dropped onto the first substrate 110 or the second substrate 120, before the first substrate 110 is assembled with the second substrate 120. Then, the first substrate 110 is assembled with the second substrate 120.

Figure 11:
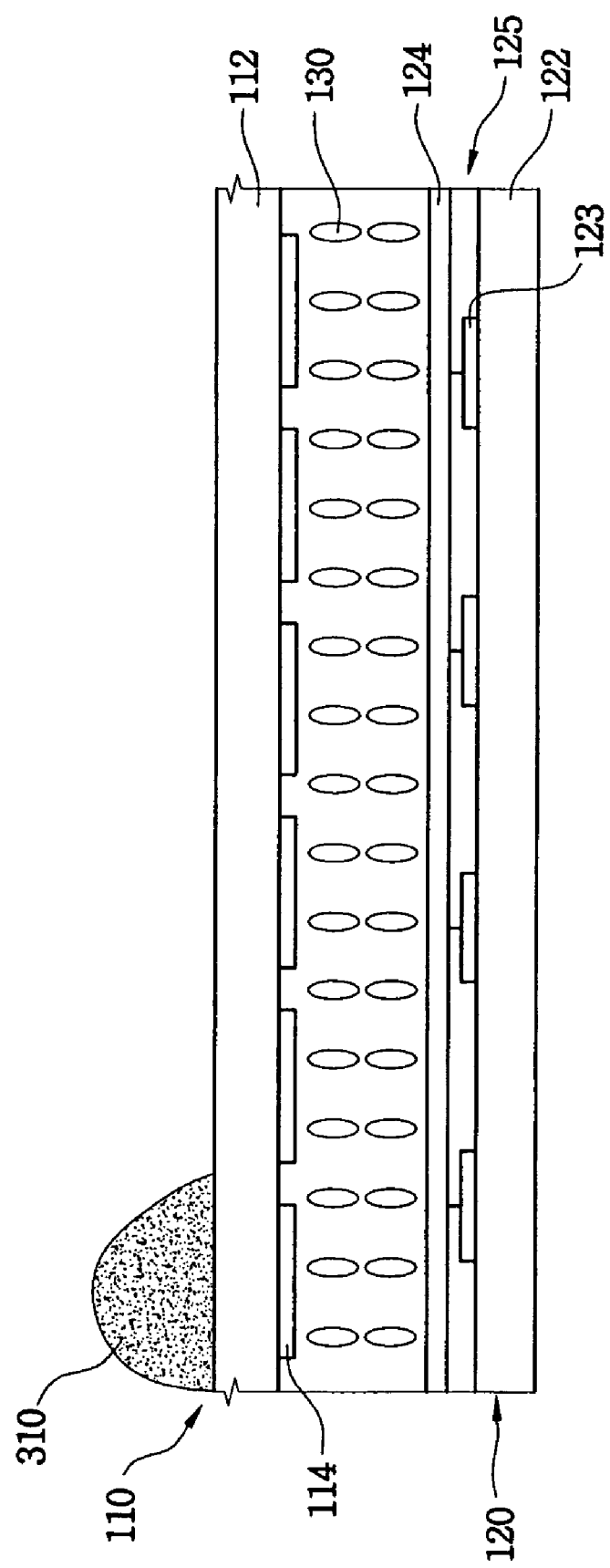
FIG. 11 is a schematic cross-sectional view showing a c-plate mono-axial compensating material disposed over a liquid crystal display panel of FIG. 10.

FIG. 11 is a schematic cross-sectional view showing a c-plate mono-axial compensating material 310 disposed over a liquid crystal display panel of FIG. 10.

Referring to FIG. 11, the c-plate mono-axial compensating material 310 may be disposed on the first substrate 110. The c-plate mono-axial compensating material 310 has fluidity. The c-plate mono-axial compensating material 310 may includes an adhesive.

Figure 12:
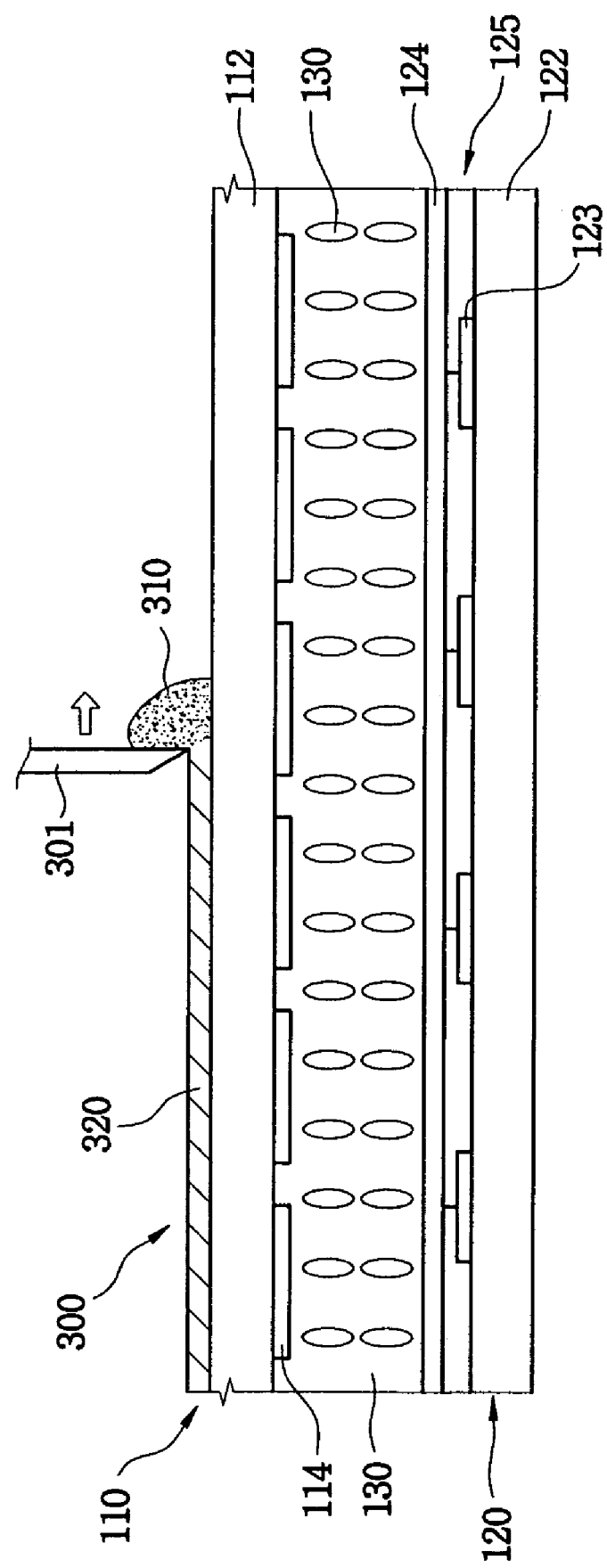
FIG. 12 is a schematic cross-sectional view showing a spreading process of a c-plate mono-axial compensating material of FIG. 11.

FIG. 12 is a schematic cross-sectional view showing a spreading process of the c-plate mono-axial compensating material 310 of FIG. 11.

Referring to FIG. 12, a spreader 301 uniformly spreads the c-plate mono-axial compensating material 310 disposed on a first substrate 110. Then, the c-plate mono-axial compensating material 310 is hardened, so that a c-plate mono-axial compensating film 300 is formed. For example, a thickness of the c-plate mono-axial compensating film 300 is in the range from about 4 μm to about 5 μm.

The c-plate mono-axial compensating film 300 has a first refractive index $n_x$, a second refractive index $n_y$, and a third refractive index $n_z$. The first refractive index $n_x$ is the refractive index of x-direction that is parallel to a surface of the c-plate mono-axial compensating film 300. The second refractive index $n_y$ is the refractive index of y-direction that is parallel to a surface of the c-plate mono-axial compensating film 300. The third refractive index $n_z$ is the refractive index of z-direction that is perpendicular to a surface of the c-plate mono-axial compensating film 300. In general, the first refractive index $n_x$ equals to the second refractive index $n_y$, and the first refractive index $n_x$ is larger than the third refractive index $n_z$ ($n_x = n_y > n_z$).

For example, the retardation $R_{th}$ of the c-plate mono-axial compensating film 300 is preferably in the range from about 220 nm to about 270 nm, where the retardation $R_{th}$ is represented by the following equation.

$$R_{th} = [(n_x + n_y)/2 - n_z] \cdot d, \qquad \text{<Expression 1>}$$

where 'd' is a thickness of the c-plate mono-axial compensating film 300.

When the retardation $R_{th}$ of the c-plate mono-axial compensating film 300 is in the range from about 220 nm to about 270 nm, the luminance and the viewing angle have maximum value as shown in FIG. 4. According to a result of simulation, when the retardation value $R_{th}$ is smaller than 220 nm or larger than 270 nm, the luminance decreases and the gray scale inversion occurs.

Figure 13:
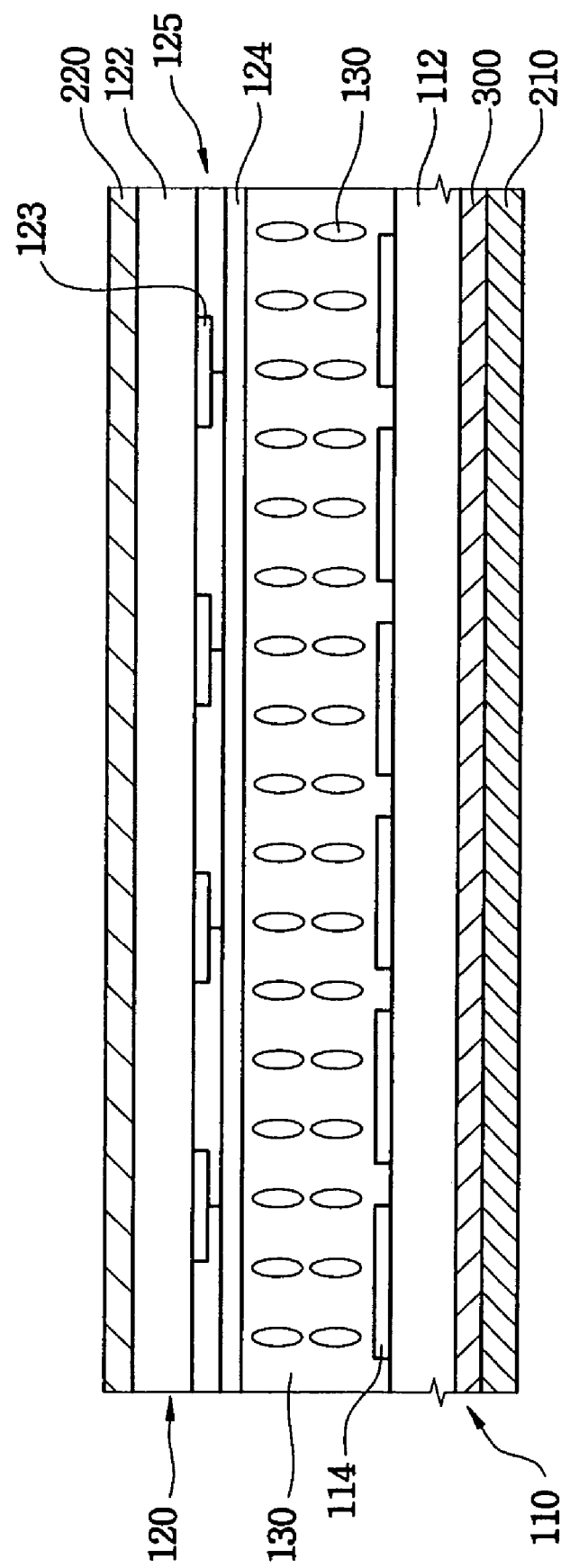
FIG. 13 is schematic cross-sectional view showing a liquid crystal display panel having a polarizing plate.

FIG. 13 is schematic cross-sectional view showing a liquid crystal display panel having a polarizing plate.

Referring to FIG. 13, when a c-plate mono-axial compensating film 300 is formed, a first polarizing plate 210 is attached on the c-plate mono-axial compensating film 300, and a second polarizing plate 220 is attached on the second substrate 120. An optical axis of the first polarizing plate 210 may be in parallel with or perpendicular to an optical axis of the second polarizing plate 220.

A liquid crystal display device according to an embodiment of the present invention has reduced thickness, weight. Further, the liquid crystal display device has increased luminance and broad viewing angle.

According to a method of manufacturing the liquid crystal display device, a number of manufacturing steps and a manufacturing time are reduced.

While the exemplary embodiments of the present invention and its advantages have been described in detail, it should be understood that various changes, substitutions and alterations can be made herein without departing from the spirit and scope of the invention as defined by appended claims.

What is claimed is:

1. A method of manufacturing a liquid crystal display (LCD) device, the method comprising steps of:

forming a first electrode on a first substrate;

forming a second electrode on a second substrate, the second substrate facing the first substrate with a gap therebetween;

disposing liquid crystal in the gap between the first electrode and the second electrode, the liquid crystal being vertically aligned when no electrical filed is formed between the first electrode and the second electrode, disposing a c-plate mono-axial compensating material having fluidity on the first substrate;

spreading the c-plate mono-axial compensating material to form a c-plate mono-axial compensating film;

curing the c-plate mono-axial compensating film;

attaching a first polarizing plate on the c-plate mono-axial compensating film; and attaching a second polarizing plate on the second substrate.

2. The method of claim 1, wherein a retardation value $R_{th}$ of the c-plate mono-axial compensating film is in a range from about 220 nm to about 270 nm, the retardation value $R_{th}$ satisfying:

$$R_{th} = [(n_x + n_y)/2 - n_z] \cdot d,$$

where $n_x$ is a first refractive index according to x-direction, $n_y$ is a second refractive index according to y-direction, $n_z$ is a third refractive index according to z-direction, and d is a thickness of the c-plate mono-axial compensating film.

3. The method of claim 2, wherein d is in a range from about 4 μm to about 5 μm.

4. The method of claim 1, wherein a cell gap between the first substrate and the second substrate is in a range from about 3.75 μm to about 4 μm.

5. The method of claim 1, wherein the first electrode is a pixel electrode and the second electrode is a common electrode facing the pixel electrode.

6. The method of claim 1, wherein the first substrate is a common electrode and the second electrode is a pixel electrode facing the common electrode.

7. The method of claim 1, wherein the c-plate mono-axial compensating material comprises an adhesive.

8. The method of claim 1, further comprising a step of forming an adhesive layer between the first the c-plate mono-axial compensating film and the polarizing plate to combine the first the c-plate mono-axial compensating film and the first polarizing plate.

9. The method of claim 1, further comprising a step of forming an adhesive layer between the second substrate and the second polarizing plate to combine the second substrate and the second polarizing plate.

* * * * *